(12) United States Patent
Kim

(10) Patent No.: US 9,136,524 B2
(45) Date of Patent: Sep. 15, 2015

(54) SECONDARY BATTERY

(75) Inventor: Dukjung Kim, Yongin-si (KR)

(73) Assignees: SAMSUNG SDI CO., LTD., Yongin-Si, Gyeonggi-Do (KR); ROBERT BOSCH GmbH, Stuttgart (DE)

(*) Notice: Subject to any disclaimer, the term of this patent is extended or adjusted under 35 U.S.C. 154(b) by 768 days.

(21) Appl. No.: 13/137,683

(22) Filed: Sep. 2, 2011

(65) Prior Publication Data

US 2012/0148884 A1 Jun. 14, 2012

(30) Foreign Application Priority Data

Dec. 9, 2010 (KR) .................. 10-2010-0125378

(51) Int. Cl.
| | |
|---|---|
| *H01M 10/42* | (2006.01) |
| *H01M 2/34* | (2006.01) |
| *H01M 2/06* | (2006.01) |
| *H01M 2/08* | (2006.01) |
| *H01M 2/30* | (2006.01) |
| *H01M 10/052* | (2010.01) |

(52) U.S. Cl.
CPC .............. *H01M 2/348* (2013.01); *H01M 2/06* (2013.01); *H01M 2/08* (2013.01); *H01M 2/30* (2013.01); *H01M 10/052* (2013.01); *H01M 2200/103* (2013.01); *Y02T 10/7011* (2013.01)

(58) Field of Classification Search
CPC ......... H01M 2/348; H01M 2/06; H01M 2/08; H01M 2/30; H01M 10/052; H01M 2200/103; Y02T 10/7011
USPC .......................................... 429/61, 64, 65, 90
See application file for complete search history.

(56) References Cited

U.S. PATENT DOCUMENTS

| | | | |
|---|---|---|---|
| 5,644,282 A * | 7/1997 | Mehta et al. ................. | 337/295 |
| 2003/0108786 A1 * | 6/2003 | Aaltonen et al. ............. | 429/61 |
| 2005/0118495 A1 * | 6/2005 | Kim .............................. | 429/56 |
| 2007/0122696 A1 * | 5/2007 | Richter et al. ............... | 429/176 |
| 2008/0254343 A1 * | 10/2008 | Kaplin et al. ................ | 429/53 |
| 2009/0081538 A1 | 3/2009 | Moon | |
| 2009/0317715 A1 | 12/2009 | Jung et al. | |
| 2010/0167116 A1 | 7/2010 | Okada | |
| 2010/0227205 A1 | 9/2010 | Byun et al. | |
| 2010/0323234 A1 * | 12/2010 | Kim et al. ..................... | 429/158 |
| 2011/0183165 A1 * | 7/2011 | Byun et al. .................... | 429/61 |

(Continued)

FOREIGN PATENT DOCUMENTS

| | | |
|---|---|---|
| JP | 05-062664 A | 3/1993 |
| JP | 2002-124236 A | 4/2002 |
| KR | 10-2008-0036252 A | 4/2008 |
| KR | 10-2009-0030710 A | 3/2009 |

(Continued)

OTHER PUBLICATIONS

KR Notice of Allowance dated Nov. 23, 2012.

*Primary Examiner* — Jonathan Jelsma
*Assistant Examiner* — Rashid Alam
(74) *Attorney, Agent, or Firm* — Lee & Morse, P.C.

(57) ABSTRACT

A secondary battery includes an electrode assembly, a case configured to accommodate the electrode assembly, a cap plate configured to seal the case, the cap plate including openings, first and second terminals electrically connected to the electrode assembly and inserted through respective openings of the cap plate, an insulating member between the cap plate and at least one of the first and second terminals, the insulating member including a penetration hole, and a fuse in the penetration hole of the insulating member, the fuse electrically connecting the cap plate and the first terminal.

4 Claims, 8 Drawing Sheets

(56) References Cited

U.S. PATENT DOCUMENTS

2011/0200849 A1\* 8/2011 Byun et al. .................. 429/7
2011/0300435 A1\* 12/2011 Byun ........................... 429/178

FOREIGN PATENT DOCUMENTS

| KR | 10-2010-0077123 A | 7/2010 |
| KR | 10-2010-0099983 A | 9/2010 |

\* cited by examiner

SECONDARY BATTERY

BACKGROUND

1. Field

Embodiments relate to a secondary battery.

2. Description of the Related Art

Secondary batteries are rechargeable unlike primary batteries. Among such secondary batteries, a low capacity battery including a battery cell in the form of a pack may be used for small portable electronic devices, e.g., cellular phones and camcorders, and a high capacity battery including dozens of battery cells connected to one another may be used as a motor-driving power source, e.g., for electric scooters, hybrid vehicles, electric vehicles, etc.

Secondary batteries are manufactured in various shapes, e.g., a cylindrical shape and a prismatic shape. A secondary battery may be manufactured as follows: an electrode assembly formed by disposing an insulating separator between a positive electrode plate and a negative electrode plate may be placed in a case together with an electrolyte, and a cap plate may be disposed on the case. The electrode assembly may be connected to positive and negative terminals which protrude from the cap plate and are exposed to the exterior of the electrode assembly.

SUMMARY

According to at least one example embodiment, a secondary battery may include an electrode assembly, a case configured to accommodate the electrode assembly, a cap plate configured to seal the case, the cap plate including openings, first and second terminals electrically connected to the electrode assembly and inserted through respective openings of the cap plate, an insulating member between the cap plate and at least one of the first and second terminals, the insulating member including a penetration hole, and a fuse in the penetration hole of the insulating member, the fuse electrically connecting the cap plate and the first terminal.

The fuse may include an elastic part, the elastic part being oriented to push against the cap plate and the first terminal.

The fuse may include a spring.

The fuse may be configured to melt and break under excessive current flow, the cap plate and the case being in an electrically neutral state when the fuse breaks.

Each of the first and second terminals may include an electrode terminal part, each electrode terminal part including an upper electrode terminal, a terminal plate integral with the upper electrode terminal and disposed above the cap plate, and a lower electrode terminal integral with the terminal plate and inserted through the opening of the cap plate.

Each of the first and second terminals may further include a flange part, each flange part including a body, an insertion part extending from the body and surrounding a hole configured to receive the lower electrode terminal, the insertion part protruding upward and downward relative to the body, and an upper part of the insertion part being inserted in the opening of the cap plate, and at least one protrusion on a bottom surface of the body.

Each of the first and second terminals may further include a collecting plate, each collecting plate including an upper end part including a main penetration hole configured to receive a lower part of the insertion part and at least one sub penetration hole configured to receive the at least one protrusion, and a connection part extending from the upper end part and electrically connected to the electrode assembly.

Each of the insulating members may includes an upper insulating member on lateral and bottom surfaces of the terminal plate, and a lower insulating member disposed among the flange part, the collecting plate, and the cap plate.

The lower insulating member may include the penetration hole, the fuse being disposed in the penetration hole of the lower insulating member to connect the cap plate and the flange part.

The upper insulating member may include the penetration hole, the fuse being in the penetration hole of the upper insulating member to connect the terminal plate and the cap plate.

The insulating member may be between the first terminal and an upper surface of the cap plate.

The fuse may be in the penetration hole of the insulating member to directly connect the first terminal and the upper surface of the cap plate.

The insulating member may be between the first terminal and a lower surface of the cap plate.

The fuse may be in the penetration hole of the insulating member to directly connect the first terminal and the lower surface of the cap plate.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
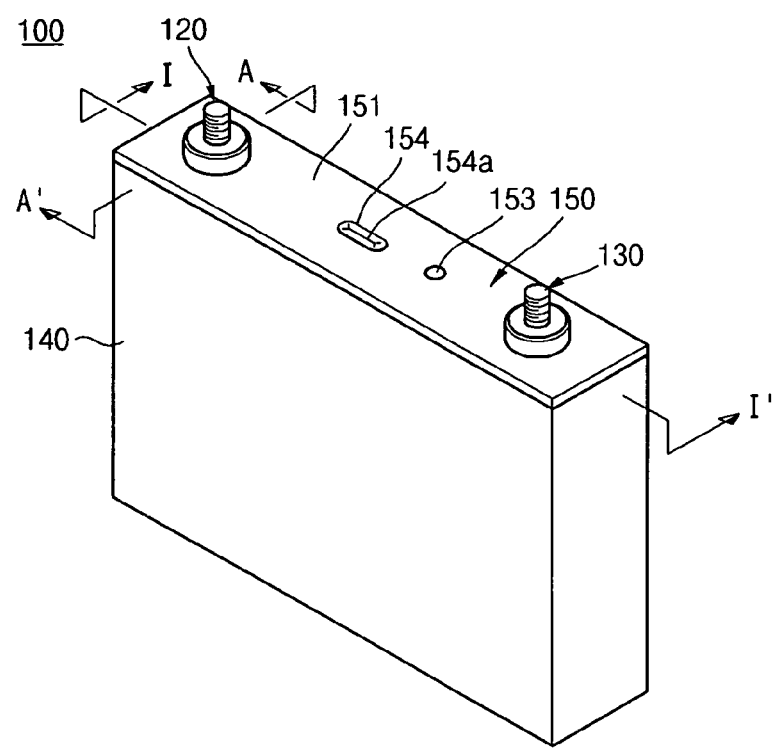
FIG. 1 illustrates a perspective view of a secondary battery according to an embodiment.

Korean Patent Application No. 10-2010-0125378 filed on Dec. 9, 2010, in the Korean Intellectual Property Office, and entitled: "Secondary Battery" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. In addition, it will be understood that when a layer is referred to as being electrically connected to another layer, it can be directly connected to the other layer, or intervening layers may also be present. Like reference numerals refer to like elements throughout.

Figure 2:
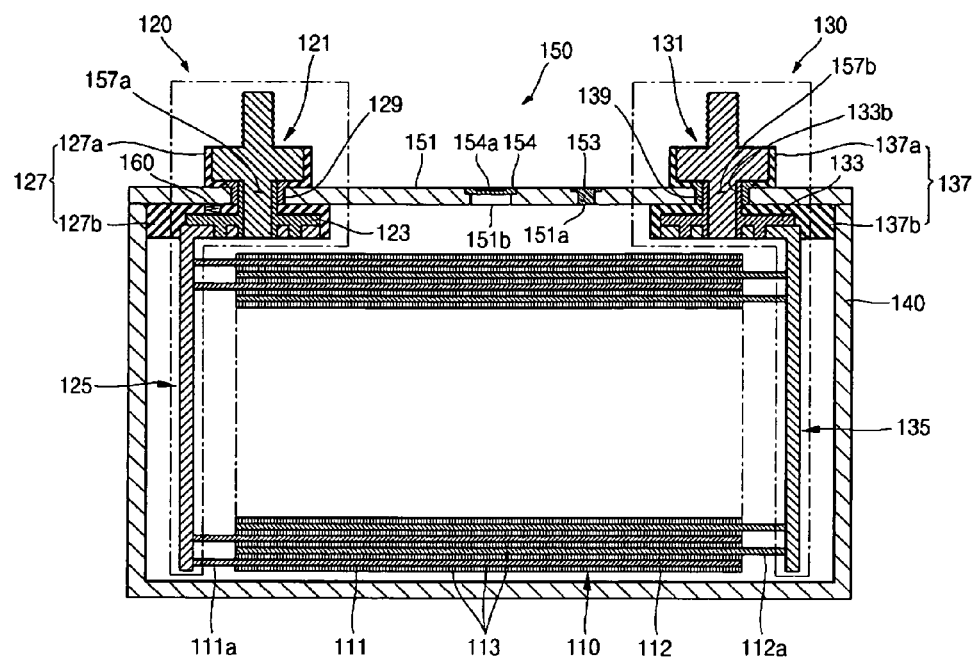
FIG. 2 illustrates a cross-sectional view taken along line I-I' of FIG. 1.

FIG. 1 illustrates a perspective view of a secondary battery 100 according to an embodiment. FIG. 2 illustrates a cross-sectional view of the secondary battery 100 along line I-I' of FIG. 1. Referring to FIGS. 1 and 2, the secondary battery 100 may include an electrode assembly 110, a first terminal 120, a first insulating member 127, a second terminal 130, a second insulating member 137, a case 140, a cap assembly 150, and a fuse 160.

The electrode assembly 110 may be formed by winding or stacking a first electrode plate 111, a separator 113, and a second electrode plate 112, which have a thin plate or film shape. For example, the first electrode plate 111 may function as a negative electrode, and the second electrode plate 112 may function as a positive electrode. Alternatively, the first electrode plate 111 and the second electrode plate 112 may function as positive and negative electrodes, respectively. The polarities of the first and second electrode plates 111 and 112 may be changed with each other.

The first electrode plate 111 may be formed by applying a first electrode active material, e.g., a transition metal oxide, to a first electrode collector formed of metal foil, e.g., aluminum foil. The first electrode plate 111 may include a first electrode non-coating portion 111a to which the first electrode active metal is not applied. The first electrode non-coating portion 111a functions as a current flow passage between the first electrode plate 111 and the outside of the first electrode plate 111. In example embodiments, materials that can be used to form the first electrode plate 111 are not limited to the above-mentioned materials.

The second electrode plate 112 may be formed by applying a second electrode active material, e.g., graphite or carbon, to a second electrode collector formed of metal, e.g., nickel or copper foil. The second electrode plate 112 may include a second electrode non-coating portion 112a to which the second electrode active metal is not applied. The second electrode non-coating portion 112a functions as a current flow passage between the second electrode plate 112 and the outside of the second electrode plate 112. In example embodiments, materials that can be used to form the second electrode plate 112 are not limited to the above-mentioned materials.

The separator 113 may be disposed between the first electrode plate 111 and the second electrode plate 112 to prevent a short circuit and allow movement of lithium ions. The separator 113 may be formed of, e.g., a poly ethylene film, a poly propylene film, or a film including poly ethylene and poly propylene. In example embodiments, materials that can be used to form the separator 113 are not limited to the above-mentioned materials.

Both ends of the electrode assembly 110 may be coupled with the first and second terminals 120 and 130 that are electrically connected to the first and second electrode plates 111 and 112, respectively.

The electrode assembly 110 may be accommodated in the case 140 together with an electrolyte. For example, the electrolyte may include an organic solvent, e.g., ethylene carbonate (EC), propylene carbonate (PC), diethyl carbonate (DEC), ethyl methyl carbonate (EMC), and/or dimethyl carbonate (DMC), and a lithium salt, e.g., $LiPF_6$ or $LiBF_4$. The electrolyte may be liquid, solid, or gel.

The first terminal 120 may be formed of a metal or an equivalent thereof, and may be electrically connected to the first electrode plate 111. The first terminal 120 penetrates a cap plate 151 (described later) of the cap assembly 150 and protrudes upward by a predetermined length. The first terminal 120 will be described in more detail below with reference to FIGS. 4A, 5, and 6.

Figure 4A:
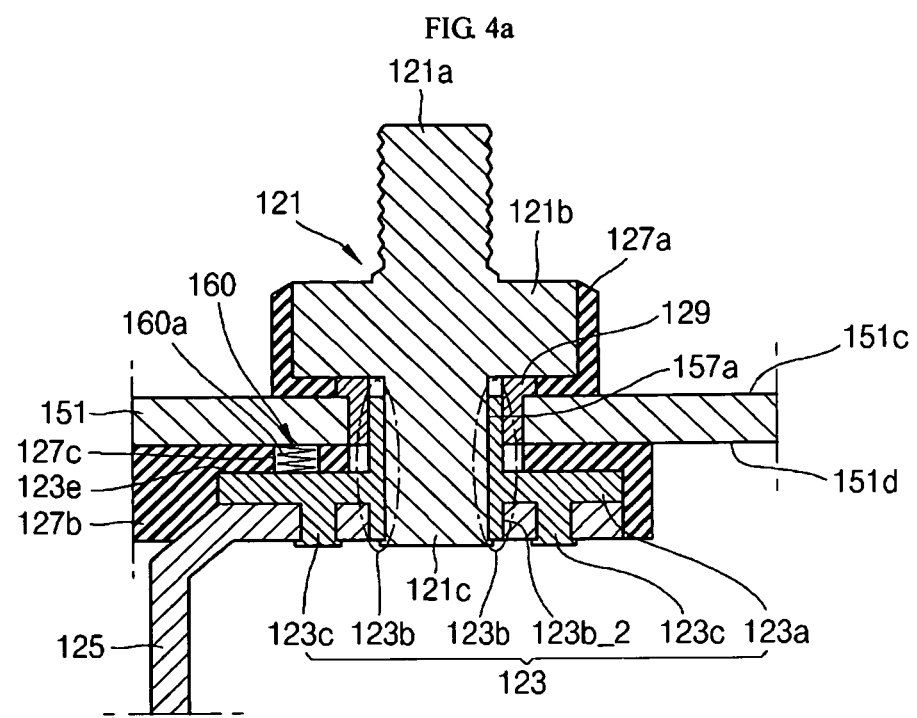
FIG. 4A illustrates an enlarged cross-sectional view of a first terminal illustrated in FIG. 2.
Figure 5:
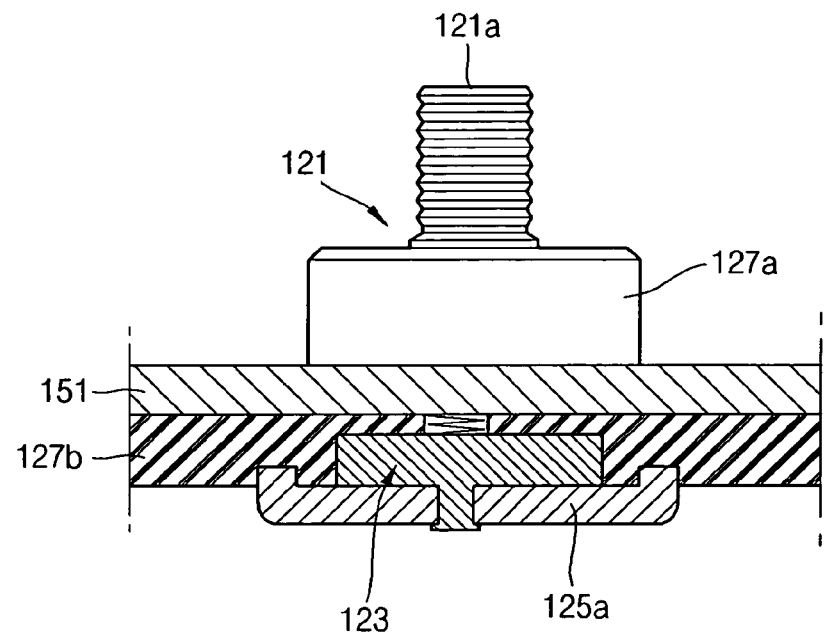
FIG. 5 illustrates a cross-sectional view taken along line A-A' of FIG. 1.
Figure 6:
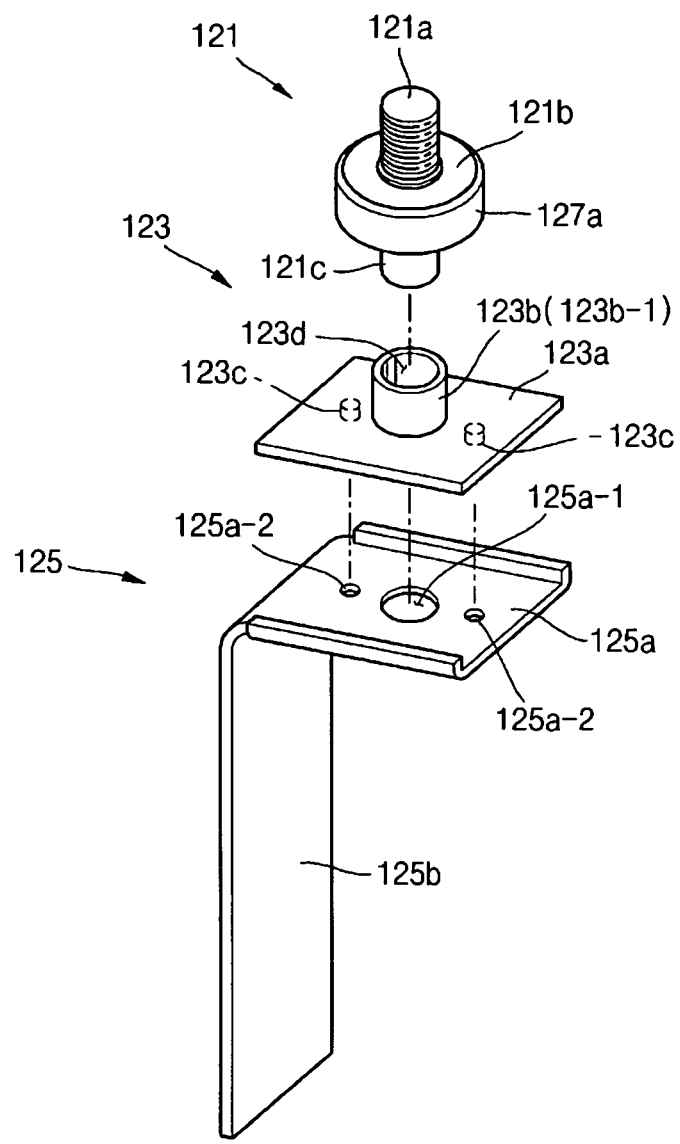
FIG. 6 illustrates an exploded perspective view of the first terminal according to an embodiment.

FIG. 4A illustrates an enlarged cross-sectional view of the first terminal 120, and FIG. 5 illustrates a cross-sectional view of the first terminal 120 taken along line A-A' of FIG. 1. FIG. 6 illustrates an exploded perspective view of the first terminal 120. Referring to FIGS. 2, 4A, 5, and 6, the first terminal 120 may include a first electrode terminal part 121, a first flange part 123, and a first collecting plate 125.

The first electrode terminal part 121 may include a first upper electrode terminal 121a, a first terminal plate 121b, and a first lower electrode terminal 121c.

The first upper electrode terminal 121a and the first terminal plate 121b may protrude upward from the cap plate 151 by predetermined lengths. The first upper electrode terminal 121a may be vertical to a top surface of the first terminal plate 121b. A plurality of threads may be formed on an outer surface of the first upper electrode terminal 121a, so that the first upper electrode terminal 121a may be coupled with, e.g., a nut.

For example, the first terminal plate 121b and the first upper electrode terminal 121a may be formed in one piece. As illustrated in FIG. 4A, the first terminal plate 121b may be disposed above the cap plate 151 and may extend laterally. For example, the first terminal plate 121b may have a cylindrical shape.

The first lower electrode terminal 121c and the first terminal plate 121b may be formed in one piece. The first lower electrode terminal 121c may be inserted through a penetration hole 157a formed in the cap plate 151, i.e., a first terminal penetration hole 157a in FIG. 2. In addition, as illustrated in FIGS. 4A and 6, the first lower electrode terminal 121c may be inserted into an insertion part 123b of the first flange part 123, as will be discussed in more detail below, and the lower end of the first lower electrode terminal 121c may be shaped like a rivet. A thread (not shown) may be formed on an outer surface of the first lower electrode terminal 121c, and a nut structure may be formed on an inner surface of the insertion part 123b for coupling between the first lower electrode terminal 121c and the first flange part 123. For example, the first electrode terminal part 121 may be formed of aluminum, an aluminum alloy, or an equivalent thereof. However, example embodiments are not limited to such materials.

As illustrated in FIG. 4A, the first flange part 123 may be coupled to the first lower electrode terminal 121c at a bottom side of the cap plate 151. As the first flange part 123 may be positioned between the cap plate 151 and the electrode assembly 110 and may be wider than the terminal penetration hole 157a, the first electrode terminal part 121 may not be detached from the cap plate 151. As illustrated in FIGS. 4A and 6, the first flange part 123 may include a body 123a, the insertion part 123b, and at least one protrusion part 123c.

Referring to FIGS. 4A and 6, the body 123a may face the bottom side of the cap plate 151 and may have a board or a plate shape. For example, the body 123a may extend in parallel to the cap plate 151, and may be wider than the first terminal penetration hole 157a.

As further illustrated in FIGS. 4A and 6, the insertion part 123b may extend upward and downward from the body 123a to define an opening 123d (FIG. 6). In detail, as illustrated in FIG. 6, the insertion part 123b may include sidewalls extending upward from the body 123a, i.e., away from the electrode assembly 110, through the first terminal penetration hole 157a and downward from the body 123a, i.e., toward the electrode assembly 110, into an opening of the collecting plate 125. The sidewalls of the insertion part 123b may be peripheral potions defining a hollow, e.g., cylindrical, tube having the opening 123d therethrough, i.e., a penetration hole through which the first lower electrode terminal 121c is inserted. As discussed previously, an upper part 123b_1 of the insertion part 123b may be inserted in the first terminal penetration hole 157a of the cap plate 151. A nut structure may be formed on an inner surface of the insertion part 123b, so the first lower electrode terminal 121c may be coupled thereto. Therefore, the coupling between the first electrode terminal part 121 and the first flange part 123, i.e., via the insertion part 123b and the first lower electrode terminal 121c, may be electrically and mechanically secure. A lower end 123b_2 of the insertion part 123b may be flush with or lower than the lower end of the first lower electrode terminal 121c.

The at least one protrusion part 123c may extend from a bottom surface of the body 123a toward the electrode assembly 110 (FIG. 4A). The first flange part 123 may include one protrusion part 123c or a plurality of protrusion parts 123c.

For example, the first flange part 123 may be formed of at least one of stainless steel, aluminum, aluminum alloy, copper, copper alloy, and an equivalent thereof. However, example embodiments are not limited to such materials.

As illustrated in FIG. 6, the first collecting plate 125 may have an approximately reverse L-shape and may be electrically connected to the first flange part 123 and the first electrode non-coating portion 111a protruding from an end of the electrode assembly 110. The first collecting plate 125 may include an upper end part 125a and a connection part 125b.

The upper end part 125a may have an approximate board or plate shape. A main penetration hole 125a-1 and at least one sub penetration hole 125a-2 may be formed in, e.g., through, the upper end part 125a. A lower part of the insertion part 123b may be inserted in the main penetration hole 125a-1. The at least one protrusion part 123c may be inserted in the at least one sub penetration hole 125a-2, i.e., a number of the protrusion parts 123c may match a number of the sub penetration holes 125a-2. For example, the main penetration hole 125a-1 may be located at a center of the upper end part 125a, and two sub penetration holes 125a-2 may be located at left and right sides of the main penetration hole 125a-1. However, example embodiments are not limited thereto. The protrusion parts 123c of the first flange part 123 may be coupled to the sub penetration holes 125a-2 of the upper end part 125a, and the lower ends of the protrusion parts 123c may be shaped like a rivet. Therefore, since the sub penetration holes 125a-2 and the protrusion parts 123c are additionally coupled, the first collecting plate 125 may not be rotated around the first lower electrode terminal 121c, and thus, the first electrode terminal part 121 may be coupled more securely.

The connection part 125b may be bent, e.g., may extend substantially vertically, from a side of the upper end part 125a. The connection part 125b may make an electrical contact with the first electrode non-coating portion 111a. For example, the first collecting plate 125 may be formed of aluminum, an aluminum alloy, and or equivalent thereof. However, example embodiments are not limited to such materials.

Figure 7:
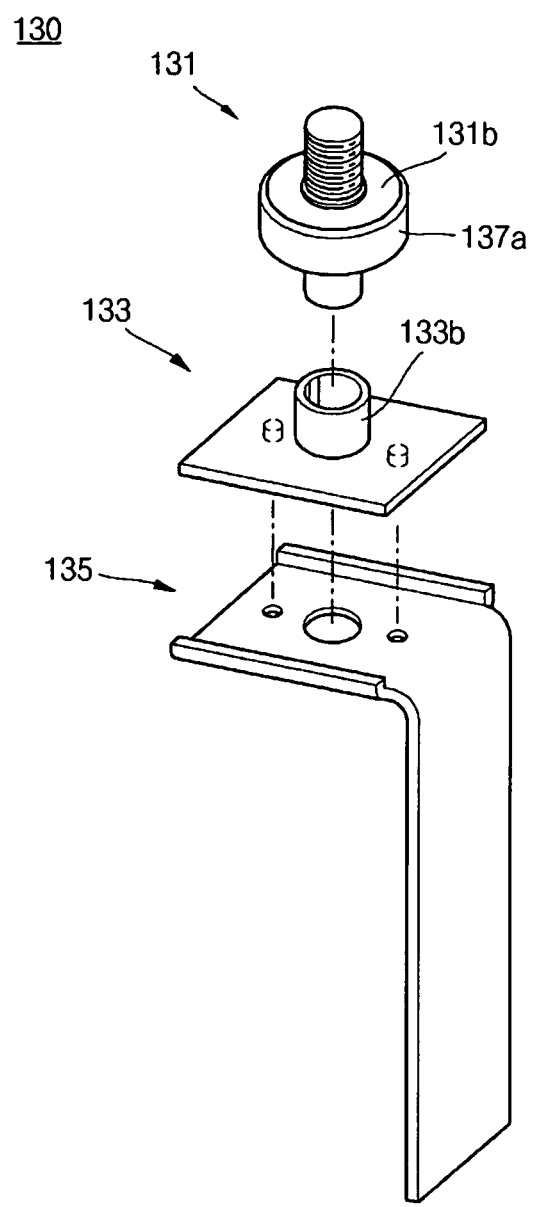
FIG. 7 illustrates an exploded perspective view of a second terminal according to an embodiment.

The second terminal 130 will be described hereinafter with reference to FIGS. 2 and 7. FIG. 7 illustrates an exploded perspective view of the second terminal 130.

The second terminal 130 may be formed of a metal or an equivalent thereof, and may be electrically connected to the second electrode plate 112 (FIG. 2). The second terminal 130 may penetrate the cap plate 151 and protrude upward by a predetermined length. As illustrated in FIG. 7, the second terminal 130 may include a second electrode terminal part 131, a second flange part 133, and a second collecting plate 135. As further illustrated in FIG. 7, the second terminal 130 may have the same shape as that of the first terminal 120. Thus, a detailed description of the second terminal 130 will be omitted. The second terminal 130 may be electrically insulated from the case 140 and the cap plate 151. The second electrode terminal part 131 may be formed of, e.g., copper, a copper alloy, and an equivalent thereof. However, example embodiments are not limited thereto.

The second flange part 133 may be formed of, e.g., stainless steel, copper, copper alloy, aluminum, aluminum alloy, and/or an equivalent thereof. However, example embodiments are not limited to such materials. The second collecting plate 135 may be formed of, e.g., copper, a copper alloy, and/or an equivalent thereof. However, example embodiments are not limited thereto.

Referring back to FIG. 2, the case 140 may be formed of a conductive metal, e.g., aluminum, aluminum alloy, and/or steel plated with nickel. For example, the case 140 may have an approximately hexahedral shape with an opening, so that the electrode assembly 110, the first terminal 120, and the second terminal 130 may be inserted and placed in the case 140. FIGS. 1 and 2 illustrate a state where the case 140 and the cap assembly 150 are coupled to each other, and the opening of the case 140 is not shown. However, the peripheral part of the cap assembly 150 substantially corresponds to the opening. An inner surface of the case 140 may be treated to be electrically insulated from the electrode assembly 110, the first and second terminals 120 and 130, and the cap assembly 150.

The cap assembly 150 is coupled to the case 140. As illustrated in FIG. 2, the cap assembly 150 may include the first insulating member 127, a first sealing gasket 129, the second insulating member 137, a second sealing gasket 139, the cap plate 151, a stopper 153, and a safety vent 154. It is noted that the first insulating member 127, the first sealing gasket 129, the second insulating member 137, and the second sealing gasket 139 may be classified as elements of the first terminal 120 and/or the second terminal 130 or independent elements instead of being classified as elements of the cap assembly 150.

Figure 3:
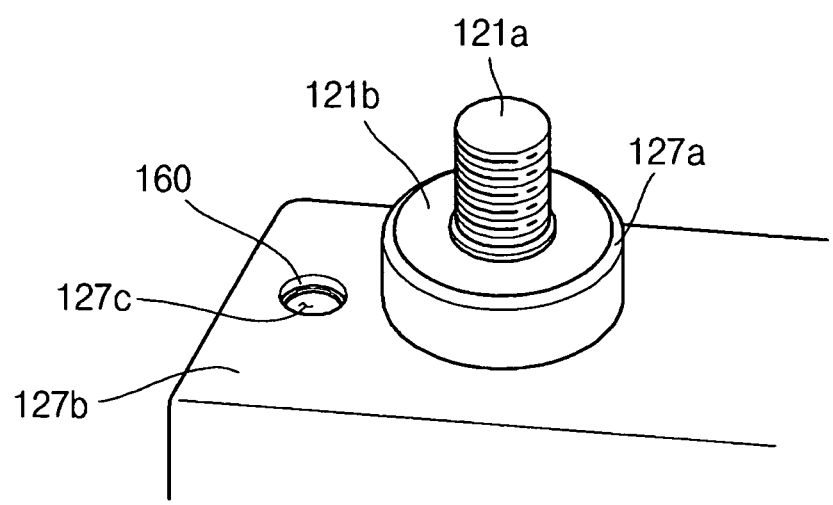
FIG. 3 illustrates an enlarged perspective view of a fuse and a respective penetration hole according to an embodiment.

The first terminal penetration hole 157a and a second terminal penetration hole 157b may be formed in the cap plate 151. The first terminal 120 may be inserted in the first terminal penetration hole 157a, and the second terminal 130 may be inserted in the second terminal penetration hole 157b. The cap plate 151 closes the opening of the case 140. The cap plate 151 may be formed of a same material as the case 140. For example, the cap plate 151 may be coupled to the case 140 by laser welding. The cap plate 151 may have a same polarity as the first terminal 120 due to the fuse 160 connected therebetween, so the case 140 may have a same polarity as the first terminal 120. The fuse 160 will be described in more detail below with reference to FIGS. 3, 4A, and 5.

Referring back to FIG. 4A, the first sealing gasket 129 may be formed of an insulating material and may be disposed between the insertion part 123b and the first terminal penetration hole 157a to seal a gap between the insertion part 123b and the cap plate 151. The second sealing gasket 139, referring to FIG. 2, may be formed of an insulating material and may be disposed between an insertion part 133b and the second terminal penetration hole 157b to seal a gap between the insertion part 133b and the cap plate 151.

The first and second sealing gaskets 129 and 139 prevent permeation of moisture into the secondary battery 100 and leakage of the electrolyte from the inside of the secondary battery 100. For example, the first and second sealing gaskets 129 and 139 may be formed of perfluoroalkoxy (PFA) that does not react with the electrolyte. However, example embodiments are not limited thereto.

As illustrated in FIG. 2, the stopper 153 seals an electrolyte injection hole 151a of the cap plate 151. The safety vent 154 may be disposed in a vent hole 151b of the cap plate 151, and a notch 154a may be formed in the safety vent 154 so that the safety vent 154 may be opened at a preset pressure.

Referring to FIGS. 4A and 5-6, the first insulating member 127 may include a first upper insulating member 127a and a first lower insulating member 127b. The first upper insulating member 127a may surround the first terminal plate 121b (FIG. 3), and may be disposed between the first terminal plate 121b and an upper surface 151c of the cap plate 151 (FIGS. 4A and 5). For example, the first upper insulating member 127a may be brought into contact with the lateral and bottom surfaces of the first terminal plate 121b. Furthermore, the first upper insulating member 127a may be brought into contact with the first sealing gasket 129. The first upper insulating member 127a insulates the first terminal plate 121b and the cap plate 151. For example, the first upper insulating member 127a may be formed of polyphenylene sulfide (PPS). However, example embodiments are not limited thereto.

The first lower insulating member 127b may be disposed among the first flange part 123, the first collecting plate 125, and the cap plate 151 to prevent an electric short circuit (FIGS. 4A and 5). In other words, portions of the first lower insulating member 127b may separate a lower surface 151d of the cap plate 151 from the first flange part 123 and the first collecting plate 125. Therefore, the first lower insulating member 127b prevents a short circuit between the first flange part 123 and the cap plate 151 and a short circuit between the first collecting plate 125 and the cap plate 151. For example, the first lower insulating member 127b may be formed of polyphenylene sulfide (PPS). However, example embodiments are not limited thereto.

As illustrated in FIG. 2, the second insulating member 137 may include a second upper insulating member 137a and a second lower insulating member 137b. The second upper insulating member 137a may be disposed between a second terminal plate 131b (FIG. 7) and the cap plate 151. For example, the second upper insulating member 137a may be brought into contact with the lateral and bottom surfaces of the second terminal plate 131b. Furthermore, the second upper insulating member 137a may be brought into contact with the second sealing gasket 139 (FIG. 2). The second upper insulating member 137a insulates the second terminal plate 131b and the cap plate 151. For example, the second upper insulating member 137a may be formed of polyphenylene sulfide (PPS). However, example embodiments are not limited thereto.

The second lower insulating member 137b may be disposed among the second flange part 133, the second collecting plate 135, and the cap plate 151, to prevent an electric short circuit. That is, the second lower insulating member 137b prevents a short circuit between the second flange part 133 and the cap plate 151 and a short circuit between the second collecting plate 135 and the cap plate 151. For example, the second lower insulating member 137b may be formed of polyphenylene sulfide (PPS). However, example embodiments are not limited thereto.

The fuse 60, as shown in FIGS. 2-4A and 5, may be disposed in a penetration hole 127c of the first lower insulating member 127b. The fuse 160 may include an elastic part 160a so that elastic forces may be applied to a bottom surface 151d of the cap plate 151 and a top surface 123e of the body 123a of the first flange part 123. For example, the elastic part 160a of the fuse 160 may have a spring structure, e.g., a flat spring or a coil string. Therefore, the fuse 160 may be securely fixed to the inside of the penetration hole 127c while pushing the bottom surface 151d of the cap plate 151 and the top surface 123e of the first flange part 123. Thus, the fuse 160 may connect the cap plate 151 and the first flange part 123 without being damaged or separated by an external impact.

The fuse 160 may connect the cap plate 151 and the first terminal 120, so that the cap plate 151 may have a same polarity as that of the first terminal 120 and may be kept at a same potential level, e.g., a positive potential level, as that of the first terminal 120. That is, due to connection to the fuse 160, the cap plate 151 may be charged with the same polarity as that of the first terminal 120, e.g., positive polarity. Since the cap plate 151 and the case 140 are electrically connected to each other, the case 140 may also be charged with the same polarity as that of the first terminal 120, e.g., positive polarity.

During regular operation of the secondary battery 100, the fuse 160 electrically and physically connects the case 140 and the cap plate 151 with the first terminal 120, so the case 140 and the cap plate 151 may be charged with the same polarity as the first terminal 120. However, if the secondary battery 100 is heated due to an excessive current, the fuse 160 may melt and break, thereby eliminating the connection between the first terminal 120 and the cap plate 151 and setting the case 140 and the cap plate 151 at an electrically neutral state. At this time, since the case 140 and the cap plate 151 are in an electrically neutral state although current flows through the first and second terminals 120 and 130, the secondary battery 100 may be safely protected from any electric interference or connection to the case 140 and the cap plate 151.

Even though the position of the fuse 160 was described in the first insulating member 127b, example embodiments are not limited thereto. For example, the fuse 160 may be disposed in the second lower insulating member 137b instead of the first lower insulating member 127b.

Figure 4B:
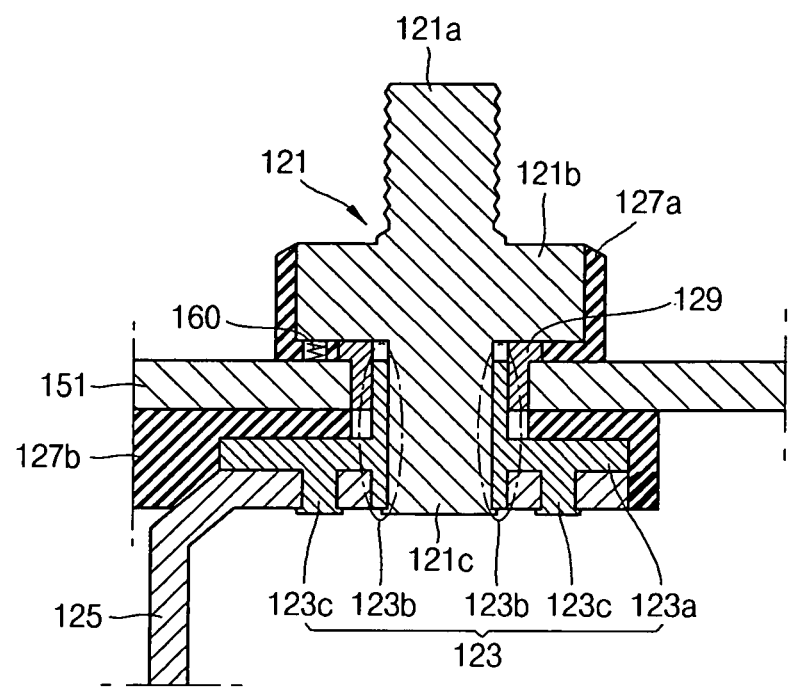
FIG. 4B illustrates an enlarged cross-sectional view of a first terminal according to another embodiment.

In yet another embodiment, as shown in FIG. 4B, the fuse 160 may be disposed in the first upper insulating member 127a or the second upper insulating member 137a instead of being disposed in the first lower insulating member 127b or the second lower insulating member 137b. For example, in the case where the fuse 160 is disposed in the first upper insulating member 127a, a penetration hole may be formed in a region of the first upper insulating member 127a located under the first terminal plate 121b, and the fuse 160 may be disposed in the penetration hole in contact with the bottom surface of the first terminal plate 121b and a top surface 151c of the cap plate 151. In this case, the first terminal 120 and the cap plate 151 may be connected to each other, and the cap plate 151 and the case 140 may be charged with the same polarity as that of the first terminal 120. In another example, the fuse 160 may be disposed in the second upper insulating member 137a in a similar way. Thus, a description thereof will be omitted.

According to example embodiments, more reliable secondary batteries may be provided.

Exemplary embodiments of a secondary battery have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A secondary battery, comprising:
an electrode assembly;
a case configured to accommodate the electrode assembly;
a cap plate configured to seal the case, the cap plate including openings;
a first terminal and a second terminal electrically connected to the electrode assembly and inserted through respective openings of the cap plate,
a first insulating member between the cap plate and the first terminal and a second insulating member between the cap plate and the second terminal, the first insulating member including a fuse penetration hole; and
a fuse located entirely within the fuse penetration hole of the first insulating member, the fuse directly contacting and electrically connecting the cap plate at one side of the first insulating member and the first terminal at an opposite side of the first insulating member, wherein the fuse includes an elastic part, the elastic part being oriented to push against the cap plate and the first terminal,
wherein each of the first terminal and the second terminal includes:
an electrode terminal part, each electrode terminal part including:
an upper electrode terminal,
a terminal plate integral with the upper electrode terminal and disposed above the cap plate, and
a lower electrode terminal integral with the terminal plate and inserted through one of the openings of the cap plate;
a flange part, each flange part including:
a body,
an insertion part extending from the body and surrounding an insertion hole configured to receive the lower electrode terminal, the insertion part protruding upward and downward relative to the body, and an upper part of the insertion part being inserted in one of the openings of the cap plate, and
at least one protrusion on a bottom surface of the body; and
a collecting plate, each collecting plate including:
an upper end part including a main penetration hole configured to receive a lower part of the insertion part and at least one sub penetration hole configured to receive the at least one protrusion, and
a connection part extending from the upper end part and electrically connected to the electrode assembly.

2. The secondary battery as claimed in claim 1, wherein the first insulating member includes:
an upper insulating member on lateral and bottom surfaces of the terminal plate; and
a lower insulating member disposed among the flange part, the collecting plate, and the cap plate.

3. The secondary battery as claimed in claim 2, wherein the lower insulating member includes the fuse penetration hole, the fuse being disposed in the fuse penetration hole of the lower insulating member to connect the cap plate and the flange part.

4. The secondary battery as claimed in claim 2, wherein the upper insulating member includes the fuse penetration hole, the fuse being in the fuse penetration hole of the upper insulating member to connect the terminal plate and the cap plate.

* * * * *